(12) United States Patent
Fernando et al.

(10) Patent No.: US 9,037,104 B2
(45) Date of Patent: May 19, 2015

(54) RECEIVER THAT RECONFIGURES BETWEEN ZERO INTERMEDIATE FREQUENCY AND DIRECT SAMPLING BASED ON CHANNEL CONDITIONS

(71) Applicant: QUALCOMM Incorporated, San Diego, CA (US)

(72) Inventors: Udara C Fernando, San Diego, CA (US); Prasad Srinivasa Siva Gudem, San Diego, CA (US)

(73) Assignee: QUALCOMM, Incorporated, San Diego, CA (US)

( * ) Notice: Subject to any disclaimer, the term of this patent is extended or adjusted under 35 U.S.C. 154(b) by 0 days.

(21) Appl. No.: 13/758,846

(22) Filed: Feb. 4, 2013

(65) Prior Publication Data
US 2014/0220920 A1    Aug. 7, 2014

(51) Int. Cl.
*H04B 1/06*    (2006.01)
*H04W 52/02*    (2009.01)
*H04B 1/00*    (2006.01)

(52) U.S. Cl.
CPC ......... *H04W 52/0245* (2013.01); *H04B 1/0021* (2013.01); *H04B 1/0025* (2013.01); *H04B 1/0007* (2013.01); *H04B 1/0028* (2013.01)

(58) Field of Classification Search
CPC .. H04B 1/0007; H04B 1/0021; H04B 1/0025; H04B 1/0028; H04B 7/02; H04B 7/08; H04B 7/0817; H04B 7/0822
USPC ........... 455/132–135, 277.1, 277.2, 296, 303, 455/334, 338, 340, 266, 254
See application file for complete search history.

(56) References Cited

U.S. PATENT DOCUMENTS 6,600,730 B1 *  7/2003  Davis et al. ............... 370/343
7,542,812 B2 *  6/2009  Stroili et al. ............. 700/90
(Continued)

FOREIGN PATENT DOCUMENTS

| EP | 2124407 A1 | 11/2009 | |
| KR | 10-0735326 | * 6/2007 | .............. H04B 1/26 |
| WO | 02067420 A2 | 8/2002 | |

OTHER PUBLICATIONS

"Direct RF-Sampling ADCs", Internet Article from National Semiconductor website, www.national.com, Published on Sep. 29, 2011.*
(Continued)

*Primary Examiner* — Duc M Nguyen
(74) *Attorney, Agent, or Firm* — Fountainhead Law Group P.C.

(57) ABSTRACT

A wireless device for receiving wireless signals based on channel conditions is described. The wireless device includes a direct sampling path used when operating in a direct sampling mode. The wireless device also includes a zero intermediate frequency path used when operating in a normal sampling mode. The wireless device further includes a first switch coupling a filter module input to an input of the direct sampling path and an input of the zero intermediate frequency path. The wireless device also includes a second coupling a filter module output to an output of the direct sampling path and an output of the zero intermediate frequency path. The first switch and the second switch are configured to switch between the direct sampling path and the zero intermediate frequency path based on a received signal power.

30 Claims, 11 Drawing Sheets

(56) References Cited

U.S. PATENT DOCUMENTS

| | | | |
|---|---|---|---|
| 7,555,258 B2* | 6/2009 | Sakurai et al. | 455/3.02 |
| 8,170,161 B2* | 5/2012 | Morris et al. | 375/347 |
| 8,538,365 B2* | 9/2013 | Croman et al. | 455/310 |
| 8,548,407 B2* | 10/2013 | Walker | 455/132 |
| 2002/0173336 A1* | 11/2002 | Ranta et al. | 455/550 |
| 2006/0009177 A1* | 1/2006 | Persico et al. | 455/143 |
| 2008/0248770 A1* | 10/2008 | Schultz et al. | 455/188.1 |
| 2009/0292196 A1* | 11/2009 | Eckert et al. | 600/407 |
| 2010/0048155 A1* | 2/2010 | Wang | 455/234.1 |
| 2010/0087227 A1 | 4/2010 | Francos et al. | |
| 2010/0285769 A1 | 11/2010 | Conroy et al. | |
| 2010/0316098 A1 | 12/2010 | Pals et al. | |
| 2011/0021168 A1 | 1/2011 | Weissman et al. | |
| 2011/0096875 A1 | 4/2011 | Amrutur et al. | |
| 2011/0170582 A1* | 7/2011 | Park et al. | 375/224 |
| 2011/0206144 A1* | 8/2011 | Yamamoto et al. | 375/259 |
| 2012/0052822 A1* | 3/2012 | Monroe | 455/90.2 |

OTHER PUBLICATIONS

"KR_2007066674_translation" document, translation from KIPO application No. 1020050128114, Pub. date Jun. 27, 2007.*

DERWENT-2008-C30177, Jung et al, "Low-power wireless transmitter/receiver with sub-sampling structure for selectively processing rf-sub sampling and if-sub sampling according to reception power strength by implementing a receiver with sub-sampling structure", Jun. 27, 2007.*

Co-pending U.S. Appl. No. 13/402,781, filed Feb. 22, 2012.
Co-pending U.S. Appl. No. 13/411,461, filed Mar. 2, 2012.
Co-pending U.S. Appl. No. 13/411,463, filed Mar. 2, 2012.
International Search Report—PCT/US2014/013794—ISA/EPO—Jul. 16, 2014.
Written Opinion—PCT/US2014/013794—ISA/EPO—Jul. 16, 2014.

* cited by examiner

RECEIVER THAT RECONFIGURES BETWEEN ZERO INTERMEDIATE FREQUENCY AND DIRECT SAMPLING BASED ON CHANNEL CONDITIONS

TECHNICAL FIELD

The present disclosure relates generally to wireless devices for communication systems. More specifically, the present disclosure relates to systems and methods for a receiver that reconfigured between zero intermediate frequency and direct sampling based on channel conditions.

BACKGROUND

Electronic devices (cellular telephones, wireless modems, computers, digital music players, Global Positioning System units, Personal Digital Assistants, gaming devices, etc.) have become a part of everyday life. Small computing devices are now placed in everything from automobiles to housing locks. The complexity of electronic devices has increased dramatically in the last few years. For example, many electronic devices have one or more processors that help control the device, as well as a number of digital circuits to support the processor and other parts of the device.

These electronic devices may transmit and receive signals wirelessly. In processing signals, electronic devices may use various filters, converters and other circuits on the electronic device. Providing power to various elements and circuits on a device may drain the battery of an electronic device. Further, when higher consuming circuitry is operating, battery life of an electronic device is shortened. Benefits may be realized by improvements to electronic devices that allow effective signal processing while shutting off higher power consuming circuitry.

SUMMARY

A wireless device for receiving wireless signals based on channel conditions is described. The wireless device includes a direct sampling path used for operations in a direct sampling mode. The wireless device also includes a zero intermediate frequency (ZIF) path for operations in a normal sampling mode. The wireless device also includes a first switch coupling a filter module input to an input of the direct sampling path and an input of the zero intermediate frequency (ZIF) path. The wireless device further includes a second switch coupling a filter module output to an output of the direct sampling path and an output of the zero intermediate frequency (ZIF) path. The first switch and the second switch are configured to switch between the direct sampling path and the zero intermediate frequency (ZIF) path based on a received signal power.

The first switch and the second switch may be positioned to allow a signal to pass through the direct sampling path when operating in the direct sampling mode. The first switch and the second switch may also be positioned to allow a signal to pass through the zero intermediate frequency (ZIF) path when operating in a normal sampling mode.

The wireless device may include an analog-to-digital converter (ADC) coupled to the second switch. The analog-to-digital converter (ADC) may be configured to sample a signal at a direct sampling rate when operating in the direct sampling mode. The analog-to-digital converter (ADC) may also be configured to sample a signal at a normal sampling rate when operating in the normal sampling mode. The direct sampling mode may include operating in one of an undersampling mode, a Nyquist mode and an oversampling mode.

The direct sampling path on the wireless device may include a tunable filter module. The zero intermediate frequency (ZIF) path may include a mixer, an oscillator and an amplifier.

The wireless device may be configured to operate in the normal sampling mode when the received signal power is less than or equal to a received signal power threshold. The wireless device may also be configured to operate in the direct sampling mode when a carrier-to-noise ratio is greater than a carrier-to-noise ratio threshold. The wireless device may be configured to operate in the normal sampling mode when a carrier-to-noise ratio is less than or equal to a carrier-to-noise ratio threshold.

The wireless device may also include a transceiver. The direct sampling path and the zero intermediate frequency (ZIF) path may be implemented on the transceiver. The wireless device may further include a first transceiver and a second transceiver. The direct sampling path may be implemented on the first transceiver and the zero intermediate frequency path (ZIF) may be implemented on the second transceiver. The first transceiver and the second transceiver may be coupled to an analog-to-digital converter (ADC). The analog-to-digital converter (ADC) may be configured to sample a signal at a direct sampling rate when operating in the direct sampling mode and at a normal sampling rate when operating in the normal sampling mode. The first transceiver may also include a first analog-to-digital converter (ADC) configured to sample a signal at a direct sampling rate. The second transceiver may include a second analog-to-digital converter (ADC) configured to sample a signal at a normal sampling rate.

A method for receiving a received signal based on channel conditions is also described. A received signal is received using an antenna. It is determined whether a received signal power is greater than a received signal power threshold. The method also includes switching between a direct sampling mode and a normal sampling mode based on the determination.

A computer-program product for receiving a received signal based on channel conditions is also described. The computer-program product includes a non-transitory computer-readable medium having instructions thereon. The instructions include code for causing a wireless device to receive a received signal using an antenna. The instructions also include code for causing the wireless device to determine whether a received signal power is greater than a received signal power threshold. The instructions also include code for causing the wireless device to switch between a direct sampling mode and a normal sampling mode based on the determination.

An apparatus for receiving wireless signals based on channel conditions is also described. The apparatus includes means for receiving a received signal. The apparatus also includes means for determining whether a received signal power is greater than a received signal power threshold. The apparatus also includes means for switching between a direct sampling mode and a normal sampling mode based on the determination.

DETAILED DESCRIPTION

Figure 1A:
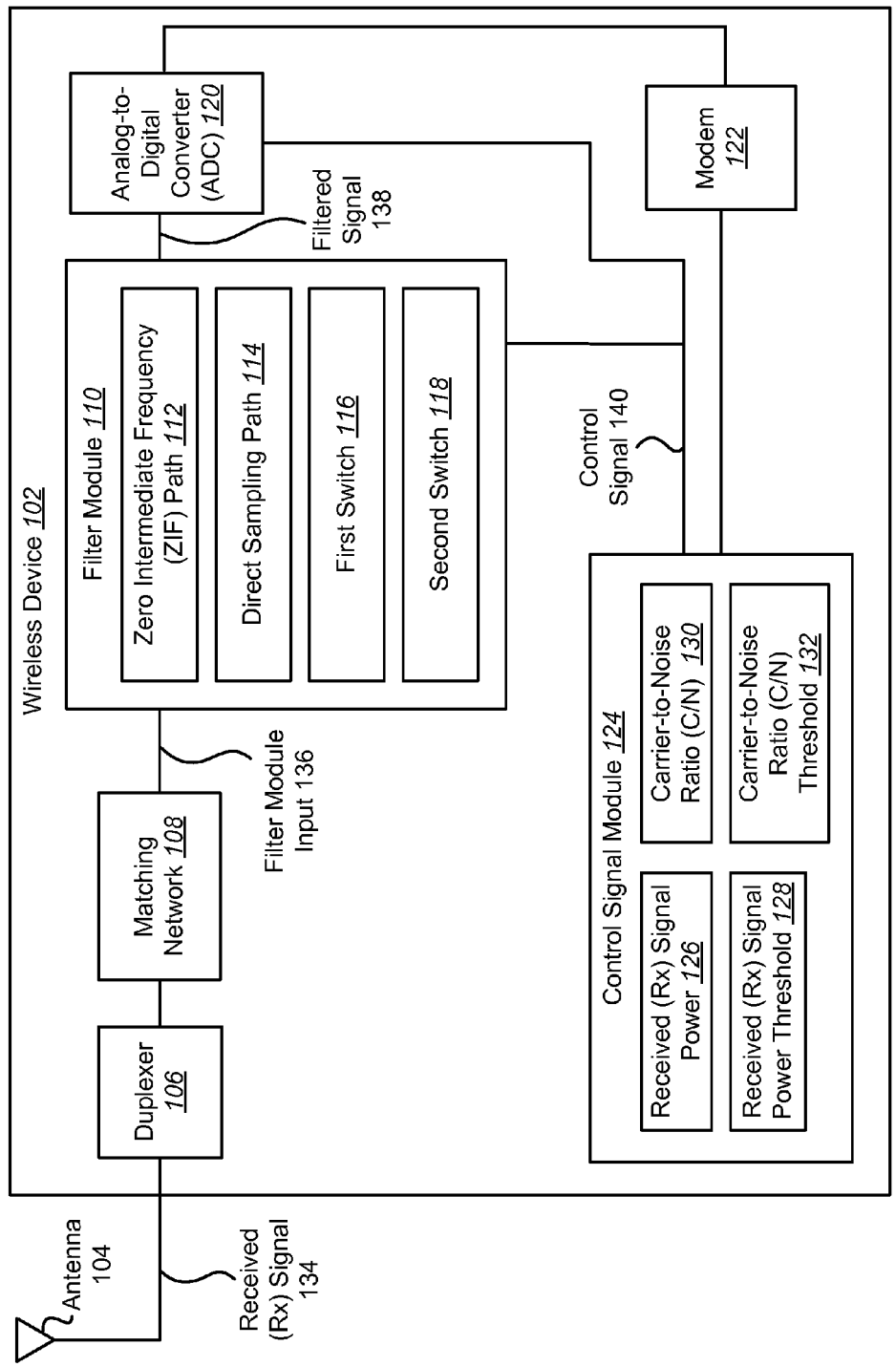
FIG. 1A shows a wireless device for use in the present systems and methods.
Figure 1B:
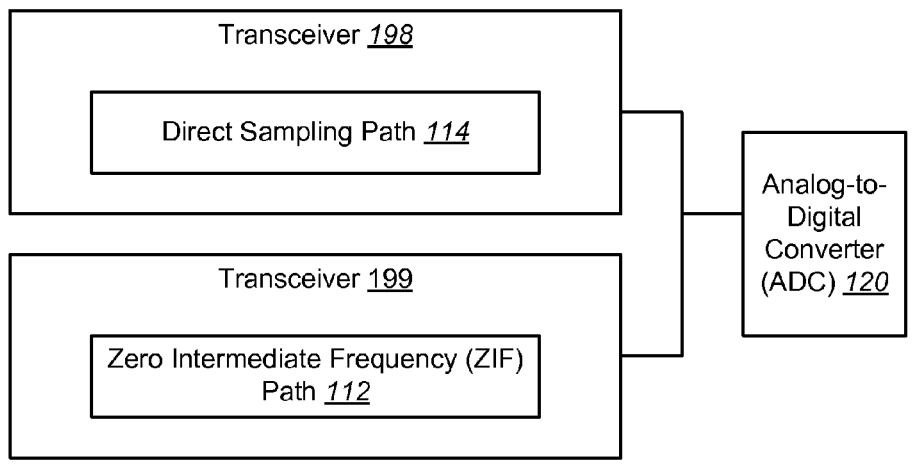
FIG. 1B shows tranceivers for use in the present systems and methods.

FIG. 1 shows a wireless device 102 for use in the present systems and methods. The wireless device 102 may be a wireless communication device or a base station. The wireless device 102 may include a filter module 110 and a control signal module 124 that allows the wireless device 102 to switch between a normal sampling mode and a direct sampling mode to optimize the power consumption of the wireless device 102 when receiving wireless signals. Switching between sampling modes may be implemented based on channel conditions. In one configuration, switching between sampling modes is implemented as part of an automatic gain control (AGC) functionality of the wireless device 102. For example, switching between a normal sampling mode and a direct sampling mode may be automatic in response to a gain of the wireless device and/or in response to a feedback signal.

Direct sampling may operate in undersampling mode, Nyquist mode or oversampling mode, based on what the technology allows. In oversampling, digital rotation/filtering may be intensive/consume large amounts of current at high speeds, making the use of a zero intermediate frequency (ZIF) filter viable. Undersampling may be attractive because the aliased samples are at baseband. In order to reduce current consumption, high-speed signal processing may have to be reduced and a voltage controlled oscillator (VCO)/phase locked loop (PLL) may not be used.

A wireless communication device may also be referred to as, and may include some or all of the functionality of, a terminal, an access terminal, a user equipment (UE), a subscriber unit, a station, etc. A wireless communication device may be a cellular phone, a personal digital assistant (PDA), a wireless device, a wireless modem, a handheld device, a laptop computer, a PC card, compact flash, an external or internal modem, a wireline phone, etc. A wireless communication device may be mobile or stationary. A wireless communication device may communicate with zero, one or multiple base stations on a downlink and/or an uplink at any given moment. The downlink (or forward link) refers to the communication link from a base station to a wireless communication device, and the uplink (or reverse link) refers to the communication link from a wireless communication device to a base station. Uplink and downlink may refer to the communication link or to the carriers used for the communication link.

A wireless communication device may operate in a wireless communication system that includes other wireless devices, such as base stations. A base station is a station that communicates with one or more wireless communication devices. A base station may also be referred to as, and may include some or all of the functionality of, an access point, a broadcast transmitter, a Node B, an evolved Node B, etc. Each base station provides communication coverage for a particular geographic area. A base station may provide communication coverage for one or more wireless communication devices. The term "cell" can refer to a base station and/or its coverage area, depending on the context in which the term is used.

Communications in a wireless communication system (e.g., a multiple-access system) may be achieved through transmissions over a wireless link. Such a communication link may be established via a single-input and single-output (SISO) or a multiple-input and multiple-output (MIMO) system. A multiple-input and multiple-output (MIMO) system includes transmitter(s) and receiver(s) equipped, respectively, with multiple (NT) transmit antennas and multiple (NR) receive antennas for data transmission. SISO systems are particular instances of a multiple-input and multiple-output (MIMO) system. The multiple-input and multiple-output (MIMO) system can provide improved performance (e.g., higher throughput, greater capacity or improved reliability) if the additional dimensionalities created by the multiple transmit and receive antennas are utilized.

The wireless communication system may utilize both single-input and multiple-output (SIMO) and multiple-input and multiple-output (MIMO). The wireless communication system may be a multiple-access system capable of supporting communication with multiple wireless communication devices by sharing the available system resources (e.g., bandwidth and transmit power). Examples of such multiple-access systems include code division multiple access (CDMA) systems, wideband code division multiple access (W-CDMA) systems, time division multiple access (TDMA) systems, frequency division multiple access (FDMA) systems, orthogonal frequency division multiple access (OFDMA) systems, single-carrier frequency division multiple access (SC-FDMA) systems, 3rd Generation Partnership Project (3GPP) Long Term Evolution (LTE) systems and spatial division multiple access (SDMA) systems.

The wireless device 102 may include an antenna 104 coupled to a duplexer 106. The duplexer 106 allows bi-directional communication over a channel. The duplexer 106 may obtain a received (Rx) signal 134 from the antenna 104. The duplexer 106 may include circuitry (e.g., a tunable filter, a band-pass filter, a surface acoustic wave (SAW) filter) for passing the received (Rx) signal 134 and filtering out unwanted frequencies. An output of the duplexer 106 may be provided to a matching network 108.

The matching network 108 may be circuitry that minimizes the difference between a load impedance (e.g., impedance into the antenna 104) and a source impedance (e.g., internal impedance). The matching network 108 may be used to maximize the power of the received (Rx) signal 134 as it passes through the wireless device 102. The matching network 108 may provide a filter module input 136 to the filter module 110.

The wireless device 102 may also include a modem 122. The modem 122 may be coupled to the output of an analog-to-digital converter (ADC) 120. The modem 122 may determine a received (Rx) signal power 126 of the received (Rx) signal 134 by digitally processing the receiver output from the RF transceiver. The received (Rx) signal power 126 may be used to determine a carrier-to-noise (C/N) ratio 130. The modem 122 may provide the received (Rx) signal power 126 and/or other measurements to a control signal module 124. The control signal module 124 may determine a carrier-to-noise (C/N) ratio 130 and/or other information about the received (Rx) signal 134 from data provided by the modem 122. The received (Rx) signal power 126 may be provided to the control signal module 124 by the modem 122. The control signal module 124 may be coupled to the filter module 110 and the analog-to-digital converter (ADC) 120. The control signal module 124 may provide a control signal 140 to the filter module 110 and the analog-to-digital converter (ADC) 120 about whether to operate in a normal mode or a direct sampling mode.

The control signal module 124 may include a received (Rx) signal power 126 and a carrier-to-noise (C/N) ratio 130. The control signal module 124 may also include a received (Rx) signal power threshold 128 and a carrier-to-noise (C/N) ratio threshold 132. The received (Rx) signal power threshold 128 may be a predefined value that the control signal module 124 compares against a received (Rx) signal power 126. The control signal module 124 may generate the control signal 140 based on a comparison of the received (Rx) signal power 126 and the received (Rx) signal power threshold 128. The carrier-to-noise (C/N) ratio threshold 132 may be a predefined value that the control signal module 124 compares against a carrier-to-noise (C/N) ratio 130. The control signal module 124 may generate a control signal 140 based on a comparison of the carrier-to-noise (C/N) ratio 130 and the carrier-to-noise (C/N) ratio threshold 132. In some configurations, the control signal module 124 may generate a control signal 140 based on a combination of factors, including the received (Rx) signal power 126 and the carrier-to-noise (C/N) ratio 130.

The control signal module 124 may determine whether the filter module 110 and analog-to-digital converter (ADC) 120 should operate in a normal sampling mode or a direct sampling mode. The control signal module 124 may generate a control signal 140 and provide the control signal 140 to the filter module 110 and/or the analog-to-digital converter (ADC) 120. The control signal 140 may instruct the filter module 110 to adjust a first switch 116 and a second switch 118 to use either a zero intermediate frequency (ZIF) path 112 or a direct sampling path 114. It should be noted that while a zero intermediate frequency (ZIF) path 112 is shown, other types of intermediate frequency paths may be implemented (e.g., a low intermediate frequency path). In one configuration, the direct sampling path 114 may be an undersampling path. The control signal 140 may also instruct the analog-to-digital converter (ADC) 120 to sample a filtered signal 138 at a normal sampling rate or a direct sampling rate.

The filter module 110 may receive a filter module input 136. The filter module 110 may include multiple filtering paths for filtering the filter module input 136. For example, the filter module 110 may include a zero intermediate frequency (ZIF) path 112 and a direct sampling path 114. Depending on the received (Rx) signal power 126, the filter module 110 may select either the zero intermediate frequency (ZIF) path 112 or the direct sampling path 114. The filter module 110 may also include a first switch 116 at an input of the filter module 110 and a second switch 118 at the output of the filter module 110. The first switch 116 and the second switch 118 may be configured to switch at approximately the same time, allowing the filter module 110 to switch between routing signals through the zero intermediate frequency (ZIF) path 112 and the direct sampling path 114. The output of the filter module 110 may be coupled to an analog-to-digital converter (ADC) 120. The filter module 110 may provide a filtered signal 138 to the analog-to-digital converter (ADC) 120.

The filter module 110 may receive a control signal 140 from the control signal module 124. The control signal 140 may indicate to the filter module 110 to operate in either a normal sampling mode or a direct sampling mode. The filter module 110 may also be configured to switch between a normal sampling mode and a direct sampling mode. Switching between a normal sampling mode and a direct sampling mode may include adjusting the first switch 116 and the second switch 118 to direct the filter module input 136 along the zero intermediate frequency (ZIF) path 112 or the direct sampling path 114.

In a normal sampling mode, the first switch 116 may be adjusted to couple the input of the filter module 110 to the zero intermediate frequency (ZIF) path 112 of the filter module 110. The second switch 118 may be adjusted to couple the output of the zero intermediate frequency (ZIF) path 112 to an input of the analog-to-digital converter (ADC) 120. During a normal sampling mode, the analog-to-digital converter (ADC) 120 may be configured to sample the filtered signal 138 at a normal sampling rate. The normal sampling rate may be a predetermined rate corresponding to settings of the wireless device 102 or the analog-to-digital converter (ADC) 120 or based on the frequency of a received (Rx) signal 134. The normal sampling rate may correspond to specifications or settings of the zero intermediate frequency (ZIF) filter path 112. In one configuration, the normal sampling rate may be the Nyquist rate (twice the bandwidth of the received (Rx) signal 134). Alternatively, the normal sampling rate may be higher or lower than the Nyquist rate.

In a direct sampling mode, the first switch 116 may be adjusted to couple the input of the filter module 110 to the direct sampling path 114 of the filter module 110. The second switch 118 may be adjusted to couple the output of the direct sampling path 114 to the input of the analog-to-digital converter (ADC) 120. The analog-to-digital converter (ADC) 120 may be configured to sample the filtered signal 138 at a direct sampling rate. The direct sampling rate may range between a variety of different sampling rates. For example, the direct sampling rate may be a Nyquist rate. In another configuration, the direct sampling rate may be an undersampling rate. An undersampling rate may include a rate below the Nyquist rate while still being able to reconstruct the filter module input 136. In one example, an undersampling rate may include frequencies below twice a baseband frequency or below twice the upper band-pass frequency of the filter module input 136. For example, if the duplexer 106 passes a frequency of 400 Megahertz (MHz), an undersampling rate may include a range of frequencies below 800 MHz. The direct sampling rate may also be an oversampling rate between the Nyquist rate and the normal sampling rate, based on what a corresponding technology node will allow. By sampling a filtered signal 138 at a direct sampling rate instead of at a normal sampling rate, the filter module 110 may avoid digital down-conversion and other power consuming digital operations that may be required for sampling at a normal sampling rate. Further, the analog-to-digital converter (ADC) 120 and other circuitry may consume less power when sampling at a direct sampling rate than when sampling at a normal sampling rate.

Figure 1C:
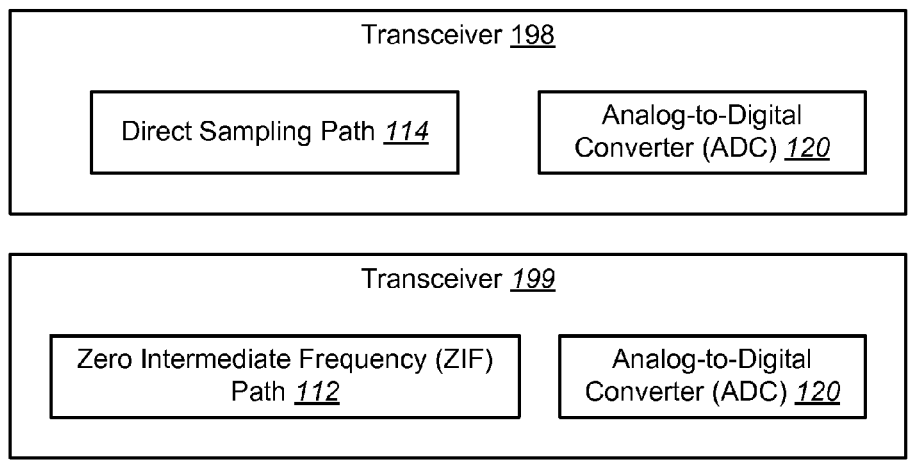
FIG. 1C shows tranceivers for use in the present systems and methods.

In one configuration, the filter module 110 may utilize one or more transceivers. Each of the zero intermediate frequency (ZIF) path 112 and a direct sampling path 114 may be implemented on a transceiver. The zero intermediate frequency (ZIF) path 112 and the direct sampling path 114 may also be located on separate transceivers. In one configuration shown in FIG. 1B, a first transceiver 199 may include the zero intermediate frequency (ZIF) path 112. A second transceiver 198 may include the direct sampling path 114 with a tunable filter. The first and second transceivers may be coupled to the analog-to-digital converter (ADC) 120 configured to switch between a normal sampling mode and a direct sampling mode. Alternatively, each of the transceivers 198 and 199 may include analog-to-digital converters (ADCs) 120 configured to operate in either a normal sampling mode or a direct sampling mode, as illustrated in FIG. 1C.

Operating in the normal sampling mode may use more battery power than operating in a direct sampling mode. In environments where the received (Rx) signal power 126 is high, the control signal module 124 may determine that a filtered signal 138 with a sufficiently high quality may be produced by operating in the direct sampling mode, thereby using less power. Additionally, in low noise and other favorable environments, if the carrier-to-noise (C/N) ratio 130 is determined to be high, the control signal module 124 may determine that a satisfactory throughput or quality of a received (Rx) signal 134 may be achieved while operating in a direct sampling mode, thereby reducing the power consumption of the wireless device 102. Other factors, such as battery power, noise figure (NF), throughput and signal quality may be considered in determining whether to operate in a normal sampling mode or a direct sampling mode.

Conversely, if the received (Rx) signal power 126 is low, the control signal module 124 may determine that operating in the direct sampling mode will not produce a satisfactory throughput or quality of the filtered signal 138. If the received (Rx) signal power 126 is low, the control signal module 124 may determine that a filtered signal 138 with sufficient quality may only be obtained by operating in the normal sampling mode rather than the direct sampling mode. Additionally, in high noise or less favorable environments, where the carrier-to-noise (C/N) ratio 130 is determined to be low, the control signal module 124 may determine that a filtered signal 138 with sufficient quality may be produced only by operating in the normal sampling mode rather than the direct sampling mode.

The wireless device 102 may determine whether to operate in the normal sampling mode or the direct sampling mode based on comparing the received (Rx) signal power 126 of the received (Rx) signal 134 and a received (Rx) signal power threshold 128. The wireless device 102 may also determine whether to operate in the normal sampling mode or the direct sampling mode based on comparing the carrier-to-noise (C/N) ratio 130 of the received (Rx) signal 134 and a carrier-to-noise (C/N) ratio threshold 132. The received (Rx) signal power threshold 128 and the carrier-to-noise (C/N) ratio threshold 132 values may be preset values based on a desired signal quality or throughput of a wireless device 102. In one configuration, the threshold values may vary depending on available bandwidth, power capacity, battery life, noise figure (NF), user preference or other factors that may affect the performance of a wireless device 102.

The control module 124 may compare a received (Rx) signal power 126 of the received (Rx) signal 134 to a received (Rx) signal power threshold 128. If the received (Rx) signal power 126 is greater than or equal to the received (Rx) signal power threshold 128, the control signal module 124 may generate and provide a control signal 140 to the filter module 110 to instruct the filter module 110 to operate in a direct sampling mode. For example, if the received (Rx) signal power threshold 128 is specified as −50 dBm (a ratio of decibels of power referenced to one milliwatt), and the received (Rx) signal power 126 is measured at −40 dBm, the filter module 110 may be instructed to operate in a direct sampling mode. The specific value of the receiver (Rx) signal power threshold 128 may vary for achieving a desired throughput or quality of a signal. Operating in a direct sampling mode may include switching from a normal sampling mode to a direct sampling mode (i.e., adjusting the first switch 116 of the filter module 110 to couple the filter module input 136 to the direct sampling path 114 and adjusting the second switch 118 of the filter module 110 to couple the output of the direct sampling path 114 to the analog-to-digital converter (ADC) 120). The filter module 110 may also provide the control signal 140 to the analog-to-digital converter (ADC) 120, instructing the analog-to-digital converter (ADC) 120 to sample the filtered signal 138 at a direct sampling rate.

If the received (Rx) signal power 126 is less than or equal to the received (Rx) signal power threshold 128, the control signal module 124 may generate and provide the control signal 140 to the filter module 110 that instructs the filter module 110 to operate in a normal sampling mode. For example, if the received (Rx) signal power threshold 128 is −55 dBm, and the received (Rx) signal power 126 is −60 dBm, the filter module 110 may be instructed to operate in a normal sampling mode. Operating in a normal sampling mode may further include switching from a direct sampling to a normal sampling mode (i.e., adjusting the first switch 116 of the filter module 110 to couple the filter module input 136 to the zero intermediate frequency (ZIF) path 112 and adjusting the second switch 118 of the filter module 110 to couple the output of the zero intermediate frequency (ZIF) path 112 to the analog-to-digital converter (ADC) 120). The filter module 110 may also provide the control signal 140 to the analog-to-digital converter (ADC) 120, instructing the analog-to-digital converter (ADC) 120 to sample the filtered signal 138 at a normal sampling rate.

The control signal module 124 may also compare the carrier-to-noise (C/N) ratio 130 of the received (Rx) signal 134 to the carrier-to-noise (C/N) ratio threshold 132. If the carrier-to-noise (C/N) ratio 130 is greater than or equal to the carrier-to-noise (C/N) ratio threshold 132, the control signal 140 provided to the filter module 110 may instruct the filter module 110 to operate in a direct sampling mode. For example, if the carrier-to-noise (C/N) ratio threshold 132 is set at 35 dBm, and the carrier-to-noise (C/N) ratio 130 of the received (Rx) signal 134 is at 45 dBm, the filter module 110 may be instructed to operate in a direct sampling mode. The specific value of the carrier-to-noise (C/N) ratio threshold 132 may vary for achieving a desired throughput or quality of a signal. The filter module 110 may also provide the control signal 140 to the analog-to-digital converter (ADC) 120 instructing the analog-to-digital converter (ADC) 120 to sample the filtered signal 138 at a direct sampling rate.

If the carrier-to-noise (C/N) ratio 130 of the received (Rx) signal 134 is less than or equal to the carrier-to-noise (C/N) ratio threshold 132, the control signal 140 provided to the filter module 110 may instruct the filter module 110 to operate in a normal sampling mode. For example, if the carrier-to-noise (C/N) ratio threshold 132 is set at 35 dBm, and the carrier-to-noise (C/N) ratio 130 of the received signal is at 10 dBm, the filter module 110 may be instructed to operate in a normal sampling mode. The filter module 110 may also provide the control signal 140 to the analog-to-digital converter (ADC) 120 instructing the analog-to-digital converter (ADC) 120 to sample the filtered signal 138 at a normal sampling rate.

Figure 2:
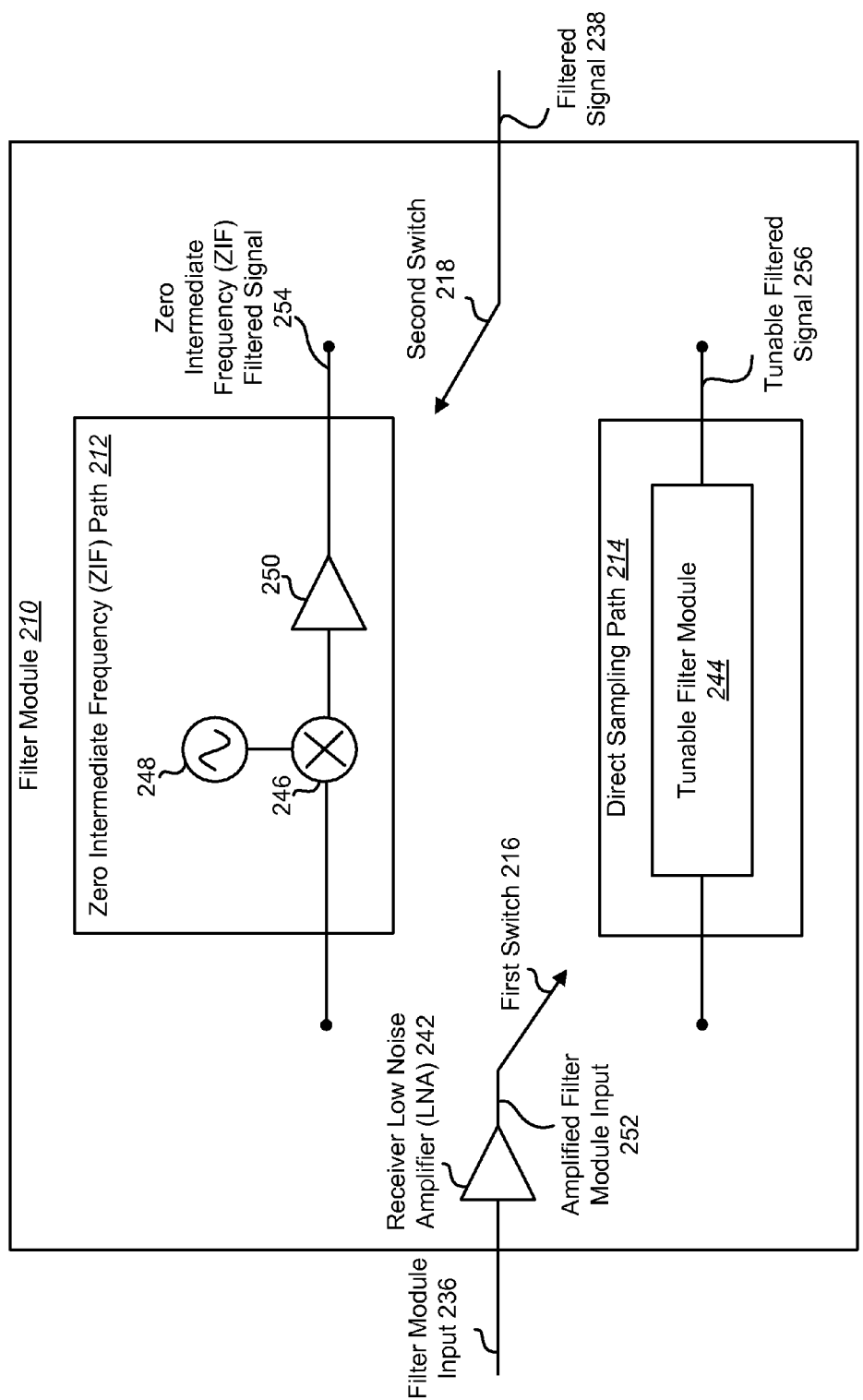
FIG. 2 illustrates one configuration of a filter module.

FIG. 2 illustrates one configuration of a filter module 210. The filter module 210 of FIG. 2 may be one configuration of the filter module 110 of FIG. 1. The filter module 210 may receive a filter module input 236 and output a filtered signal 238. The filter module 210 may include a zero intermediate frequency (ZIF) path 212 and a direct sampling path 214. The filter module 210 may use a first switch 216 and a second switch 218 to couple an input of the filter module 210 to an output of the filter module 210 via either the zero intermediate frequency (ZIF) path 212 or the direct sampling path 214.

The filter module 210 may include a receiver low noise amplifier (LNA) 242. The receiver low noise amplifier (LNA) 242 may be coupled to the input of the filter module 210. The output of the receiver low noise amplifier (LNA) 242 may be coupled to the first switch 216.

In a normal sampling mode, the first switch 216 may be adjusted to couple the output of the receiver low noise amplifier (LNA) 242 to the zero intermediate frequency (ZIF) path 212 of the filter module 210. The zero intermediate frequency (ZIF) path 212 may include a mixer 246, an oscillator 248 and an amplifier 250. The mixer 246 may be a frequency mixer for shifting or otherwise changing the frequency of signals input to the zero intermediate frequency (ZIF) path 212. The mixer may be coupled to the oscillator 248. The oscillator 248 may generate a frequency used by the mixer 246 and shift the frequency of an input signal. The mixer 246 may combine the input signal and the frequency from the oscillator 248 to obtain a mixed signal.

The output of the mixer 246 may be coupled to the amplifier 250. The amplifier 250 may amplify the mixed signal and produce a zero intermediate frequency (ZIF) filtered signal 254. The zero intermediate frequency (ZIF) filtered signal 254 may be centered around a baseband frequency. The zero intermediate frequency (ZIF) path 212 may include additional circuitry (not shown) for filtering the filter module input 236. The zero intermediate frequency (ZIF) filtered signal 254 may be provided to the output of the filter module 210 via the second switch 218.

In a direct sampling mode, the first switch 216 may be adjusted to couple the output of the receiver low noise amplifier (LNA) 242 to the direct sampling path 214 of the filter module 210. The direct sampling path 214 may include a tunable filter module 244. The tunable filter module 244 may include one or more filters (e.g., tunable filters, low pass filters, bandpass filters, surface acoustic wave (SAW) filters, etc.) implemented within the direct sampling path 214. The tunable filter module 244 may permit low frequency signals to pass while preventing higher frequencies from passing. The tunable filter module 244 may be used to counter affects (e.g., flyback) of the duplexer 106 on the received (Rx) signal 134. The tunable filter module 244 may also reduce the effects of noise and other undesirable influences on the received (Rx) signal 134 at higher frequencies. The tunable filter module 244 may output a tunable filtered signal 256. The tunable filtered signal 256 may be provided to the output of the filter module 210 via the second switch 218.

Figure 3:
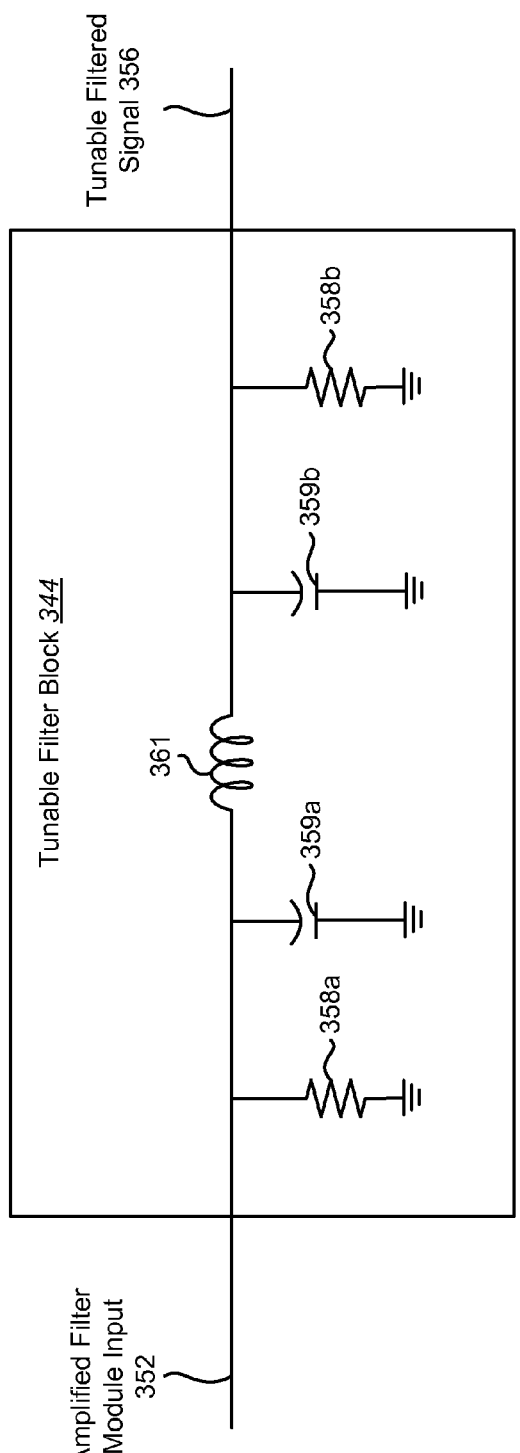
FIG. 3 is a circuit diagram of one configuration of a tunable filter block for use in the present systems and methods.

FIG. 3 is a circuit diagram of one configuration of a tunable filter block 344 for use in the present systems and methods. The tunable filter block 344 of FIG. 3 is one configuration of a filter that may be used as part of the tunable filter module 244 described in connection with FIG. 2. Moreover, other configurations of filters (e.g., tunable filters, low pass filters) may be used for passing a certain range of frequencies of a signal. In one example, the tunable filter block 344 may include a combination of resistors 358*a-b*, capacitors 359*a-b* and inductors 361. FIG. 3 shows one example of how resistors 358, capacitors 359 and inductors 361 may be arranged for passing low frequencies while blocking high frequencies of an amplified filter module input 352.

The input to the tunable filter block 344 may be referred to as an amplified filter module input 352. The tunable filter block 344 may output a tunable filtered signal 356. The amplifier filter module input 352 may be coupled to the output of the receiver low noise amplifier (LNA) 242. In one configuration, the tunable filter block 344 may include a first resistor 358*a* coupled between the amplified filter module input 352 and ground and a first capacitor 359*a* coupled between the amplified filter module input 352 and ground. An inductor 361 may be coupled between the amplified filter module input 352 and the output of the tunable filter block 344. A second inductor 359*b* may be coupled between the output of the tunable filter block 344 and ground. A second resistor 358*b* may also be coupled between the output of the tunable filter block 344 and ground.

Figure 4:
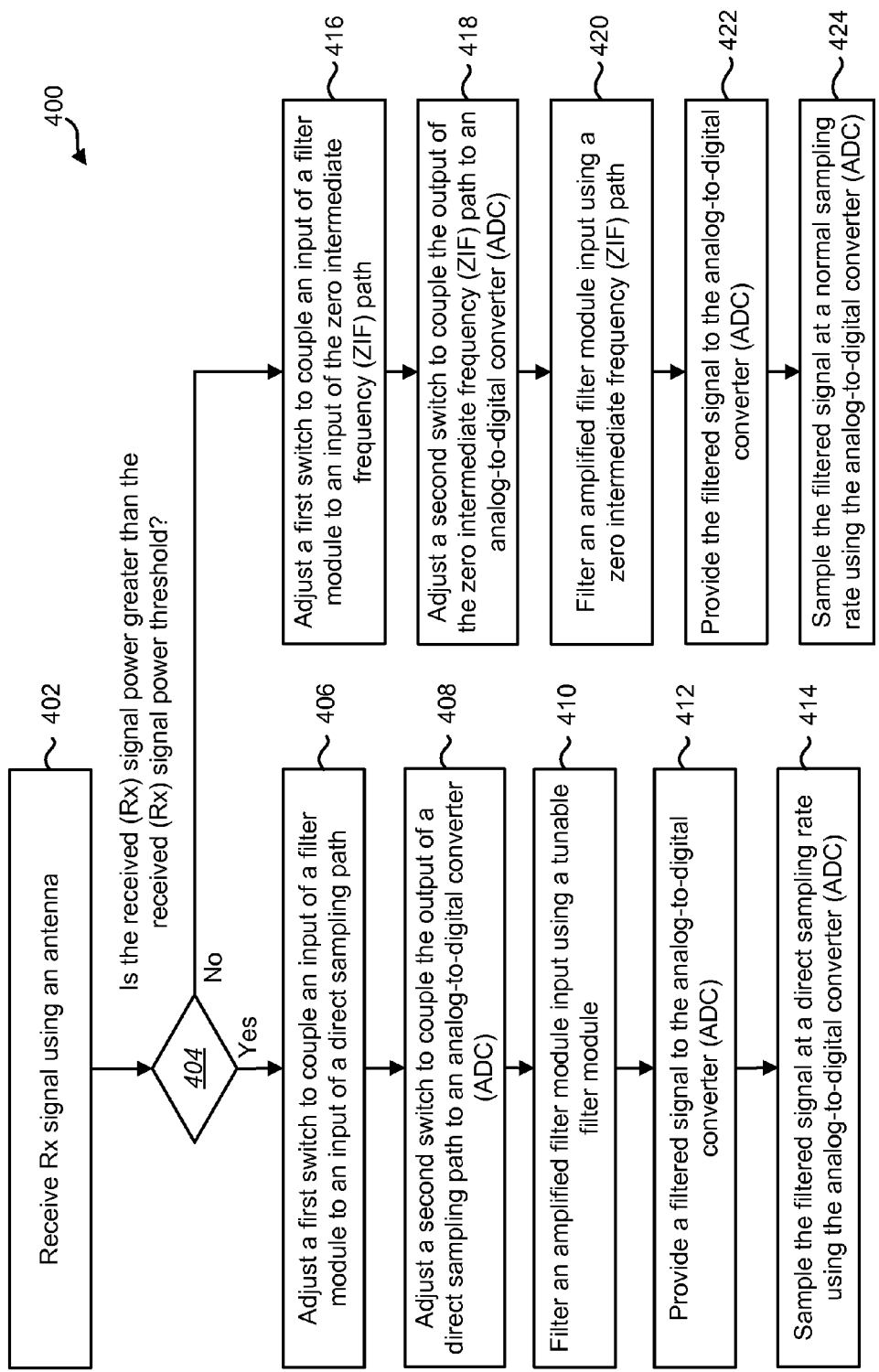
FIG. 4 is a flow diagram of a method for switching between a normal sampling mode and a direct sampling mode.

FIG. 4 is a flow diagram of a method 400 for switching between a normal sampling mode and a direct sampling mode. The method 400 may be performed by a wireless device 102. The wireless device 102 may include a filter module 110 and a control signal module 124. In one configuration, the method may be performed by the control signal module 124.

The wireless device 102 may receive 402 a received (Rx) signal 134 using an antenna 104. The wireless device 102 may determine 404 whether the received (Rx) signal power 126 is greater than the received (Rx) signal power threshold 128. If it is determined 404 that the received (Rx) signal power 126 is greater than the received (Rx) signal power threshold 128, the wireless device 102 may instruct the filter module 110 to switch to operating in a direct sampling mode. If not already in a direct sampling mode, the filter module 210 may switch to operating in a direct sampling mode. In switching to operating in a direct sampling mode, the wireless device 102 may adjust 406 a first switch 116 to couple an input of the filter module 110 to an input of a direct sampling path 114. The wireless device 102 may also adjust 408 a second switch 118 to couple an output of the direct sampling path 114 to an analog-to-digital converter (ADC) 120.

The wireless device 102 may filter 410 an amplified filter module input 252 using a tunable filter module 244. The tunable filter module 244 may permit low frequency signals to pass through the direct sampling path 214 while filtering out higher frequency signals. The tunable filter module 244 may be used to counter some negative effects (e.g., flyback) of the duplexer 106 and other undesirable influences on the received (Rx) signal 134 at higher frequencies. The wireless device 102 may provide 412 a filtered signal 238 to an analog-to-digital converter (ADC) 120.

In the direct sampling mode, the wireless device 102 may sample 414 the filtered signal at a direct sampling rate using an analog-to-digital converter (ADC) 120. The direct sampling rate may range between a variety of different sampling rates. For example, the direct sampling rate may be a Nyquist rate. In another configuration, the direct sampling rate may be an undersampling rate. An undersampling rate may include a rate below the Nyquist rate while still being able to reconstruct the filter module input 136. In one example, an undersampling rate may include frequencies below twice a baseband frequency or below twice the upper band-pass frequency of the filter module input 136. The direct sampling rate may also be an oversampling rate between the Nyquist rate and the normal sampling rate, based on what a corresponding technology node will allow. By sampling the filtered signal 138, the analog-to-digital converter (ADC) 120 may convert the filtered signal 138 to a digital approximation of the filtered signal 138.

If it is determined 404 that the received (Rx) signal power 126 is not greater than the received (Rx) signal power threshold 128, the wireless device 102 may instruct the filter module 110 to switch to operating in a normal sampling mode. If not already in a normal sampling mode, the filter module 110 may switch to operating in a normal sampling mode. In switching to operating in a normal sampling mode, the wireless device 102 may adjust 416 a first switch 116 to couple an input of the filter module 110 to an input of the zero intermediate frequency (ZIF) path 112. The wireless device 102 may also adjust 418 a second switch 118 to couple an output of the zero intermediate frequency (ZIF) path 112 to an analog-to-digital converter (ADC) 120.

The wireless device 102 may filter 420 an amplified filter module input 252 using the zero intermediate frequency (ZIF) path 212. The zero intermediate frequency (ZIF) path 212 may include a mixer 246, oscillator 248, amplifier 250 and other components for filtering the amplified filter module input 252. The zero intermediate frequency (ZIF) path 212 may provide the zero intermediate frequency (ZIF) filtered signal 254 to the output of the filter module 210. Thus, the wireless device 102 may provide 422 a filtered signal 238 to the analog-to-digital converter (ADC) 120.

In the normal sampling mode, the wireless device 102 may sample 424 the filtered signal 138 at a normal sampling rate using the analog-to-digital converter (ADC) 120. The normal sampling rate may be a predetermined rate corresponding to settings of the wireless device 102 or the analog-to-digital converter (ADC) 120 or based on the frequency of a received (Rx) signal 134. The normal sampling rate may correspond to specifications or settings of the zero intermediate frequency (ZIF) path 112. In one configuration, the normal sampling rate may be the Nyquist rate (twice the bandwidth of the received (Rx) signal 134). Alternatively, the normal sampling rate may be higher or lower than the Nyquist rate. By sampling the filtered signal 138, the analog-to-digital converter (ADC) 120 may convert the filtered signal 138 to a digital approximation of the filtered signal 138.

Figure 5:
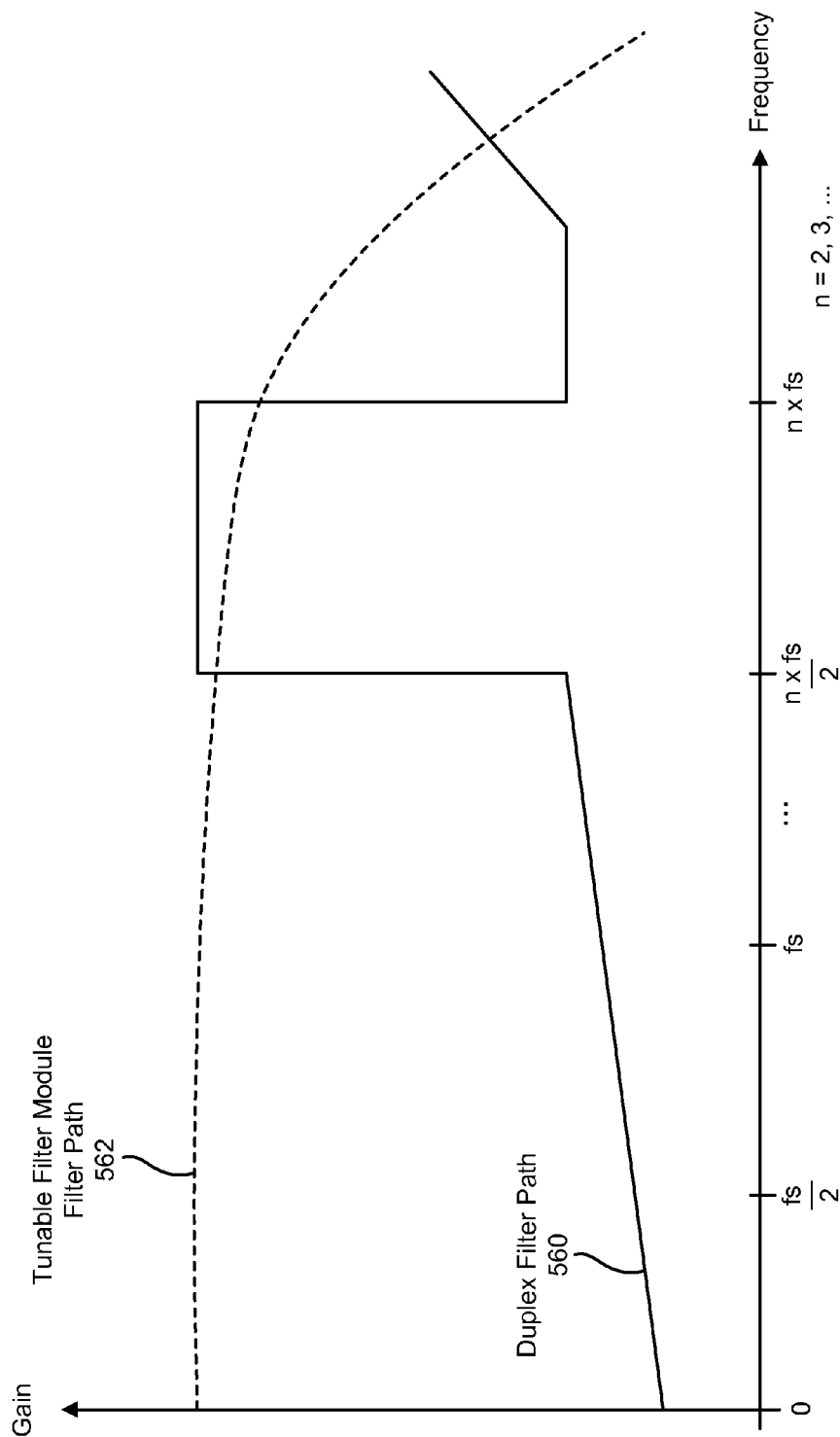
FIG. 5 is a graph showing multiple filter paths for use in a direct sampling mode.

FIG. 5 is a graph showing multiple filter paths for use in a direct sampling mode. The graph shows examples of the gain of a duplexer filter path 560 and the gain of a tunable filter module filter path 562 versus frequency. In the graph, the sample frequency of the analog-to-digital converter (ADC) 120 is fs.

The duplexer filter path 560 may be configured to pass a specific range of frequencies. The duplexer 106 may also block out any frequencies below the specified or desired range of frequencies. The duplexer 106 may be designed to pass a frequency range corresponding to the radio frequency (RF) spectrum. For example, the duplexer 106 may be designed to pass a range of frequencies corresponding to the TV spectrum. In one configuration, the duplexer 106 may pass frequencies between 400-1000 Megahertz (MHz). In another configuration, the duplexer 106 may pass frequencies between 412-690 MHz. In another configuration, the duplexer 106 may pass frequencies between 460-614 MHz. In yet another configuration, the duplexer 106 may pass frequencies between 470-500 MHz. The duplexer 106 may pass different ranges of frequencies depending on the available bandwidth, capabilities or application requirements of the wireless device 102.

While the duplexer 106 may block out interference, jammers and other sources of noise that may degrade the quality of a received (Rx) signal 134 at lower frequencies, other sources of interference or noise may exist at the baseband frequency or at higher frequencies that may have a negative impact on the quality of the received (Rx) signal 134. For example, where jammers are blocking signal transmissions at lower frequencies, jammers may produce aliased noise that overlap in frequency with the range of frequencies passed by the duplexer 106. The duplexer 106 may also fail to prevent aliased noise, interference, anti-aliasing, leakage, flyback, packaging defects and other factors that may affect a signal at higher frequencies.

A tunable filter module 244 may be implemented in the direct sampling path 214 to compensate for high frequency effects on the received (Rx) signal 134. The tunable filter module filter path 562 shows that the tunable filter module 244 permits lower frequency signals to pass while filtering out high frequency signals that the duplexer 106 may fail to block. The duplexer 106 and tunable filter module 244 may be implemented together for filtering signals that follow the direct sampling path 214. The duplexer 106 may be used to filter out low frequency signals while passing a specific range of frequencies. The tunable filter module 244 may be used to filter out high frequency signals that may diminish the quality of the received signal at high frequencies. The combination of the duplexer 106 and tunable filter module 244 may be used to pass a specific range of frequencies while filtering out undesired effects at low and high frequencies outside a specified frequency range.

Figure 6:
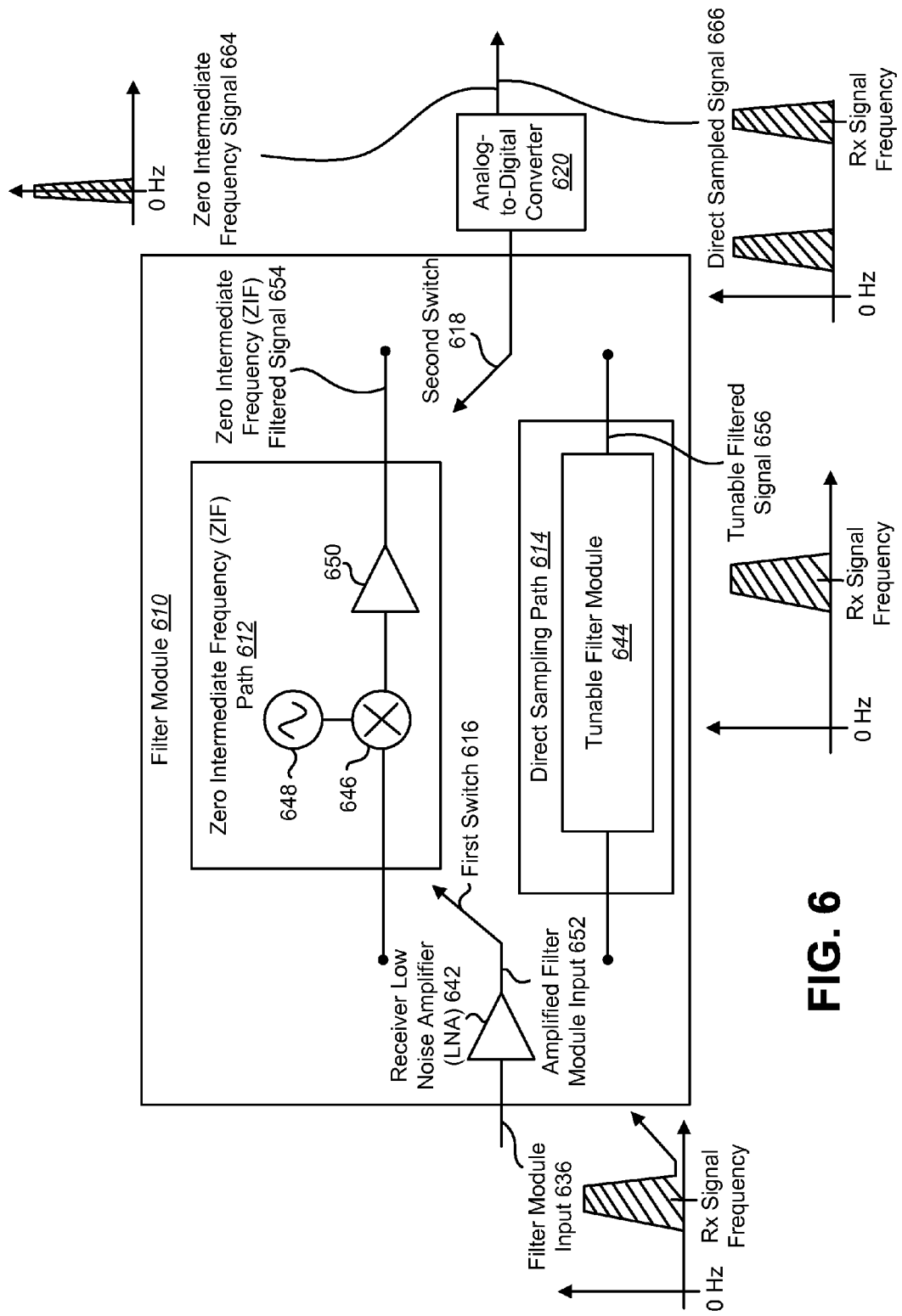
FIG. 6 illustrates another configuration of a filter module.

FIG. 6 illustrates another configuration of a filter module 610. The filter module 610 of FIG. 6 may be one configuration of the filter module 110 of FIG. 1. The filter module 610 may receive a filter module input 636 and output either a zero intermediate frequency (ZIF) signal 664 using a zero intermediate frequency path 612 or a direct sampled signal 666 using a direct sampling path 614. The filter module 610 may use a first switch 616 and a second switch 618 to couple an input of the filter module 610 to an output of the filter module 610 via either the zero intermediate frequency (ZIF) path 612 or the direct sampling path 614.

The filter module input 636 may be a bandpass signal centered around the received (Rx) signal 134 frequency. At higher frequencies, the filter module input 636 may be affected by flyback, packaging, alias noise, jammers or other detrimental influences that may affect the received (Rx) signal 134.

The filter module 610 may include a receiver low noise amplifier (LNA) 642. The receiver low noise amplifier (LNA) 642 may be coupled to the input of the filter module 610. The output of the receiver low noise amplifier (LNA) 642 may be coupled to the first switch 616. The receiver low noise amplifier (LNA) 642 may amplify the filter module input 636 and output an amplified filter module input 652.

In a normal sampling mode, the first switch 616 may be adjusted to couple the output of the receiver low noise amplifier (LNA) 642 to the zero intermediate frequency (ZIF) path 612 of the filter module 610. The zero intermediate frequency (ZIF) path 612 may include a mixer 646, oscillator 648 and an amplifier 650. The mixer 646 may be a frequency mixer for shifting or otherwise changing the frequency of signals input to the zero intermediate frequency (ZIF) path 612. The mixer 646 may be coupled to the oscillator 648. The oscillator 648 may generate a frequency used by the mixer 646 and shift the frequency of an input signal. The mixer 646 may combine the input signal and the frequency from the oscillator 648 to obtain a mixed signal.

The output of the mixer 646 may be coupled to the amplifier 650. The amplifier 650 may amplify the mixed signal. The zero intermediate frequency path 612 may output a zero intermediate frequency (ZIF) filtered signal 654. The zero intermediate frequency (ZIF) filtered signal 654 may be centered around a baseband frequency. The zero intermediate frequency (ZIF) path 612 may include additional circuitry (not shown) for filtering the amplified filter module input 652. The zero intermediate frequency (ZIF) filtered signal 654 may be provided to the output of the filter module 610 via the second switch 618.

The output of the filter module 610 may be provided to an analog-to-digital converter (ADC) 620. In a normal sampling mode, the analog-to-digital converter (ADC) 620 may sample the output of the filter module 610 at a normal sampling rate. In a normal sampling mode, the analog-to-digital converter (ADC) 620 may output a zero intermediate frequency (ZIF) signal 664. The zero intermediate frequency (ZIF) signal 664 may be a high quality digital approximation of the output of the filter module 610 centered around the baseband frequency.

In a direct sampling mode, the first switch 616 may be adjusted to couple the output of the receiver low noise amplifier (LNA) 642 to the direct sampling path 614 of the filter module 610. The direct sampling path 614 may include a tunable filter module 644. The tunable filter module 644 may permit low frequency signals to pass while preventing higher frequencies from passing. The tunable filter module 644 may be used to counter affects (e.g., flyback) of the duplexer 106 on the received (Rx) signal 134. The tunable filter module 644 may also reduce the effects of noise and other undesirable influences on the received (Rx) signal 134 at higher frequencies. The tunable filter module 644 may output a tunable filtered signal 656. The tunable filtered signal 656 may be provided to the output of the filter module 610 via the second switch 618. The tunable filtered signal 656 may be similar to the filter module input 636 without some of the higher frequency effects.

In a direct sampling mode, the analog-to-digital converter (ADC) 620 may sample the output of the filter module 610 at a direct sampling rate. In a direct sampling mode, the analog-to-digital converter (ADC) 620 may output a direct sampled signal 666. The direct sampled signal 666 may be a digital approximation of the output of the filter module 610 including a replica of the received (Rx) signal near the baseband frequency.

Figure 7:
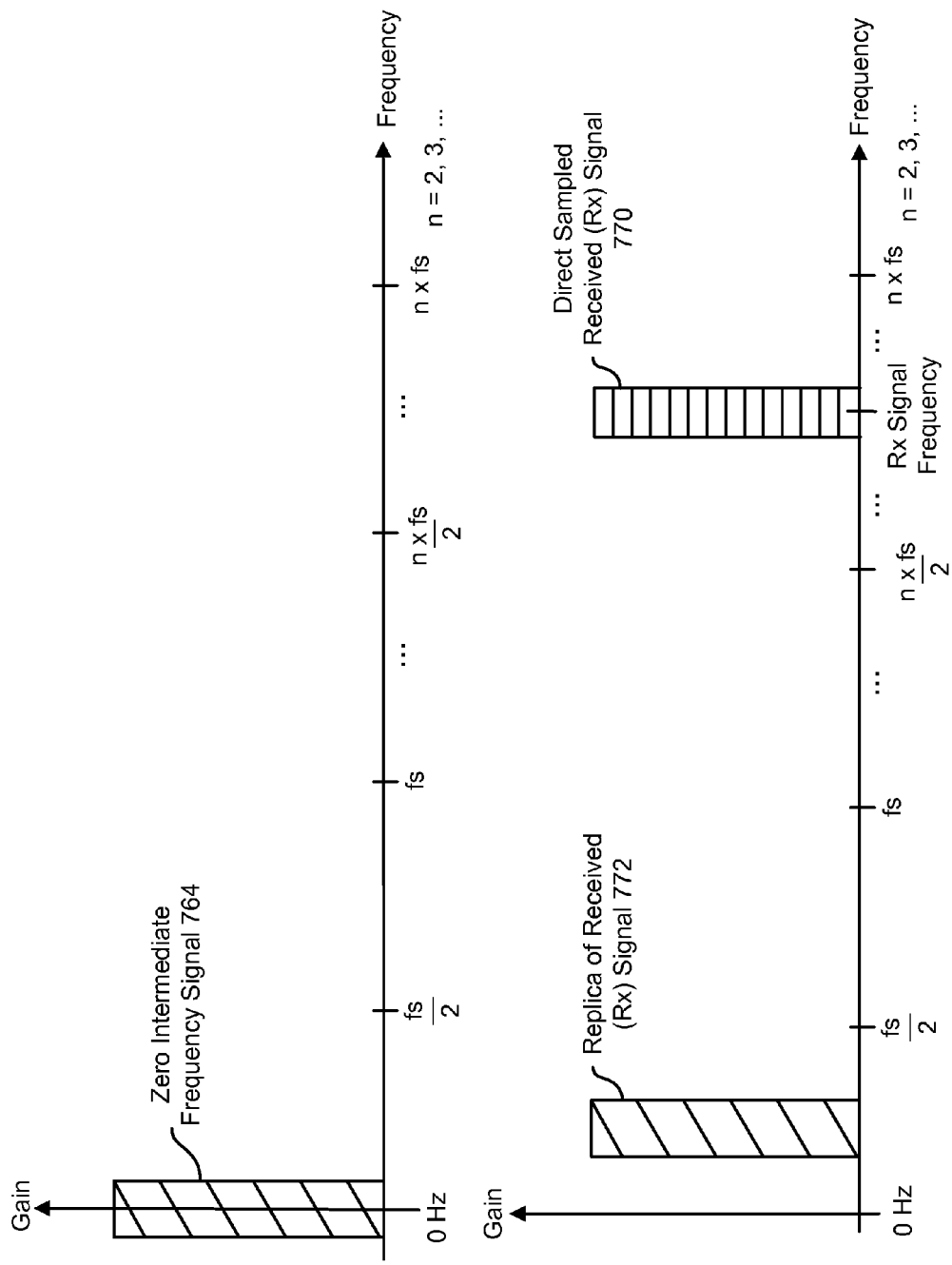
FIG. 7 is a graph that shows a zero intermediate frequency (ZIF) signal from a normal sampling mode and a direct sampled signal from a direct sampling mode.

FIG. 7 is a graph that shows a zero intermediate frequency (ZIF) signal 764 from a normal sampling mode and a direct sampled signal from a direct sampling mode. In the normal sampling mode, the received (Rx) signal 134 may pass through the duplexer 106, matching network 108 and the zero intermediate frequency (ZIF) path 112 of the filter module 110. The duplexer 106 may isolate a specific frequency range of the received (Rx) signal 134. A filter module input 136 may be provided to the filter module 110 and passed through the zero intermediate frequency (ZIF) path 112. The filter module 110 may output a filtered signal 138 and provide the filtered signal 138 to an analog-to-digital (ADC) converter 120. The analog-to-digital converter (ADC) 120 may sample the filtered signal 138 at a normal sampling rate and output a zero intermediate frequency (ZIF) signal 764. In the normal sampling mode, the zero intermediate frequency (ZIF) signal 764 may be a high quality digital approximation of the received (Rx) signal 134 centered around a baseband frequency.

In a direct sampling mode, a received (Rx) signal 134 may pass through a duplexer 106, matching network 108 and direct sampling path 114 of the filter module 110. The duplexer 106 may isolate a specific frequency range of the received (Rx) signal 134. A filter module input 136 may be provided to the filter module 110 and passed through the direct sampling path 114. The filter module 110 may output a filtered signal 138 and provide the filtered signal 138 to an analog-to-digital converter (ADC) 120. The analog-to-digital converter (ADC) 120 may sample the filtered signal 138 at a direct sampling rate and output a direct sampled signal. In the direct sampling mode, the direct sampled signal may include direct sampled received (Rx) signal 770 at the received (Rx) signal 134 frequency. In some configurations, the direct sampled received (Rx) signal 770 may be at a higher or lower frequency than the received (Rx) signal 134 frequency. The direct sampled signal may also include a replica of the received (Rx) signal 772 near the baseband frequency. In some configurations, where the sampling frequency (fs) is greater than twice the frequency of the received (Rx) signal, the direct sampling rate may be a Nyquist rate or oversampling rate.

Figure 8:
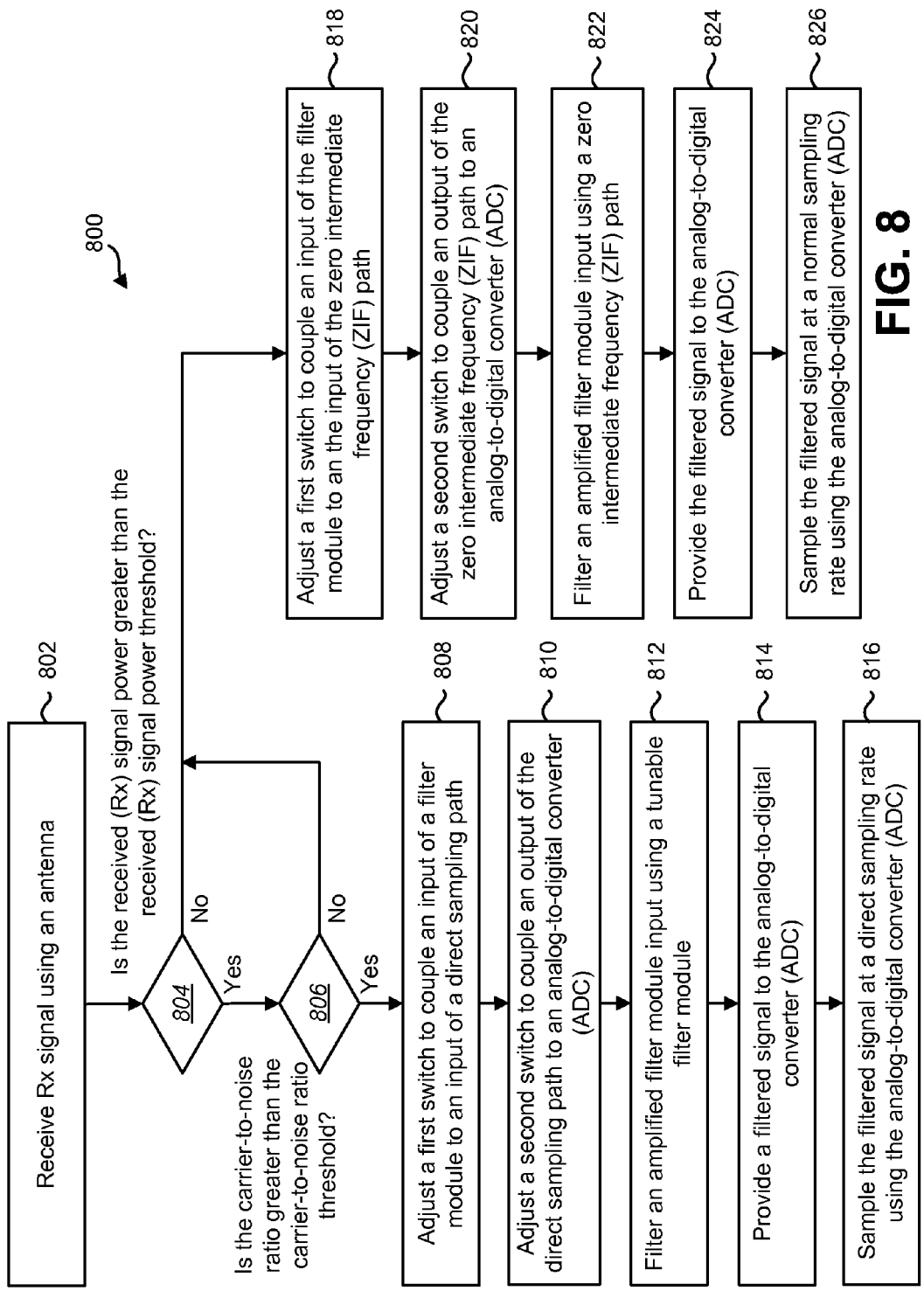
FIG. 8 is a flow diagram of another method for switching between a normal sampling mode and a direct sampling mode.

FIG. 8 is a flow diagram of another method 800 for switching between a normal sampling mode and a direct sampling mode. The method 800 may be performed by a wireless device 102. The wireless device 102 may include a filter module 110 and a control signal module 124. In one configuration, the method may be performed by the control signal module 124.

The wireless device 102 may receive 802 a received (Rx) signal 134 using an antenna 104. The wireless device 102 may determine 804 whether the received (Rx) signal power 126 is greater than the received (Rx) signal power threshold 128. If it is determined 804 that the received (Rx) signal power 126 is greater than the received (Rx) signal power threshold 128, the wireless device 102 may also determine 806 whether the carrier-to-noise (C/N) ratio 130 of the received (Rx) signal 134 is greater than the carrier-to-noise (C/N) ratio threshold 132.

If the carrier-to-noise (C/N) ratio 130 is greater than the carrier-to-noise (C/N) ratio threshold 132, the wireless device 102 may instruct the filter module 110 to switch to operating in a direct sampling mode. If not already in a direct sampling mode, the filter module 110 may switch to operating in a direct sampling mode. In switching to operating in a direct sampling mode, the wireless device may adjust 808 a first switch 116 to couple an input of the filter module 110 to an input of a direct sampling path 114. The filter module 110 may also adjust 810 a second switch 118 to couple an output of the direct sampling path 114 to an analog-to-digital converter (ADC) 120.

The wireless device 102 may filter 812 an amplified filter module input 252 using a tunable filter module 244. The tunable filter module 244 may permit low frequency signals to pass through the direct sampling path 214 while filtering out higher frequency signals. The tunable filter module 244 may be used to counter some negative effects (e.g., flyback) of the duplexer 106 and other undesirable influences on the received (Rx) signal 134 at higher frequencies. The wireless device 102 may provide 814 a filtered signal 238 to an analog-to-digital converter (ADC) 120.

The wireless device 102 may then sample 816 the filtered signal 238 at a direct sampling rate using the analog-to-digital converter (ADC) 120. The direct sampling rate may range between a variety of different sampling rates. For example, the direct sampling rate may be a Nyquist rate. In another configuration, the direct sampling rate may be an undersampling rate. An undersampling rate may include a rate below the Nyquist rate while still being able to reconstruct the filter module input 136. In one example, an undersampling rate may include frequencies below twice a baseband frequency or below twice the upper band-pass frequency of the filter module input 136. The direct sampling rate may also be an oversampling rate between the Nyquist rate and the normal sampling rate, based on what a corresponding technology node will allow. By sampling the filtered signal 138, the analog-to-digital converter (ADC) 120 may convert the filtered signal 138 to a digital approximation of the filtered signal 138.

If it is determined 804 that the received (Rx) signal power 126 is not greater than the received (Rx) signal power threshold 128 or if it is determined 806 that the carrier-to-noise (C/N) ratio 130 of the received (Rx) signal 134 is not greater than a carrier-to-noise (C/N) ratio threshold 132, the wireless device 102 may instruct the filter module 110 to switch to operating in a normal sampling mode. If not already in a normal sampling mode, the filter module 110 may switch to operating in a normal sampling mode. In switching to operating in the normal sampling mode, the wireless device 102 may adjust 818 the first switch 116 to couple an input of the filter module 110 to an input of the zero intermediate frequency (ZIF) path 112. The wireless device 102 may also adjust 820 the second switch 118 to couple an output of the zero intermediate frequency (ZIF) path 112 to an analog-to-digital converter (ADC) 120.

The wireless device 102 may filter 822 an amplified filter module input 252 using the zero intermediate frequency (ZIF) path 212. The zero intermediate frequency (ZIF) path 212 may include a mixer 246, oscillator 248, amplifier 250 and other components for filtering the amplified filter module input 252. The zero intermediate frequency (ZIF) path 212 may provide the zero intermediate frequency (ZIF) filtered signal 254 to the output of the filter module 210. The wireless device 102 may provide 824 a filtered signal 238 to the analog-to-digital converter (ADC) 120.

In the normal sampling mode, the wireless device 102 may sample 826 the filtered signal 138 at a normal sampling rate using the analog-to-digital converter (ADC) 120. The normal sampling rate may be a predetermined rate corresponding to settings of the wireless device 102 or the analog-to-digital converter (ADC) 120 or based on the frequency of a received (Rx) signal 134. The normal sampling rate may correspond to specifications or settings of the zero intermediate frequency (ZIF) path 112. In one configuration, the normal sampling rate may be the Nyquist rate (twice the bandwidth of the received (Rx) signal 134). Alternatively, the normal sampling rate may be higher or lower than the Nyquist rate. By sampling the filtered signal 138, the analog-to-digital converter (ADC) 120 may convert the filtered signal 138 to a digital approximation of the filtered signal 138.

Figure 9:
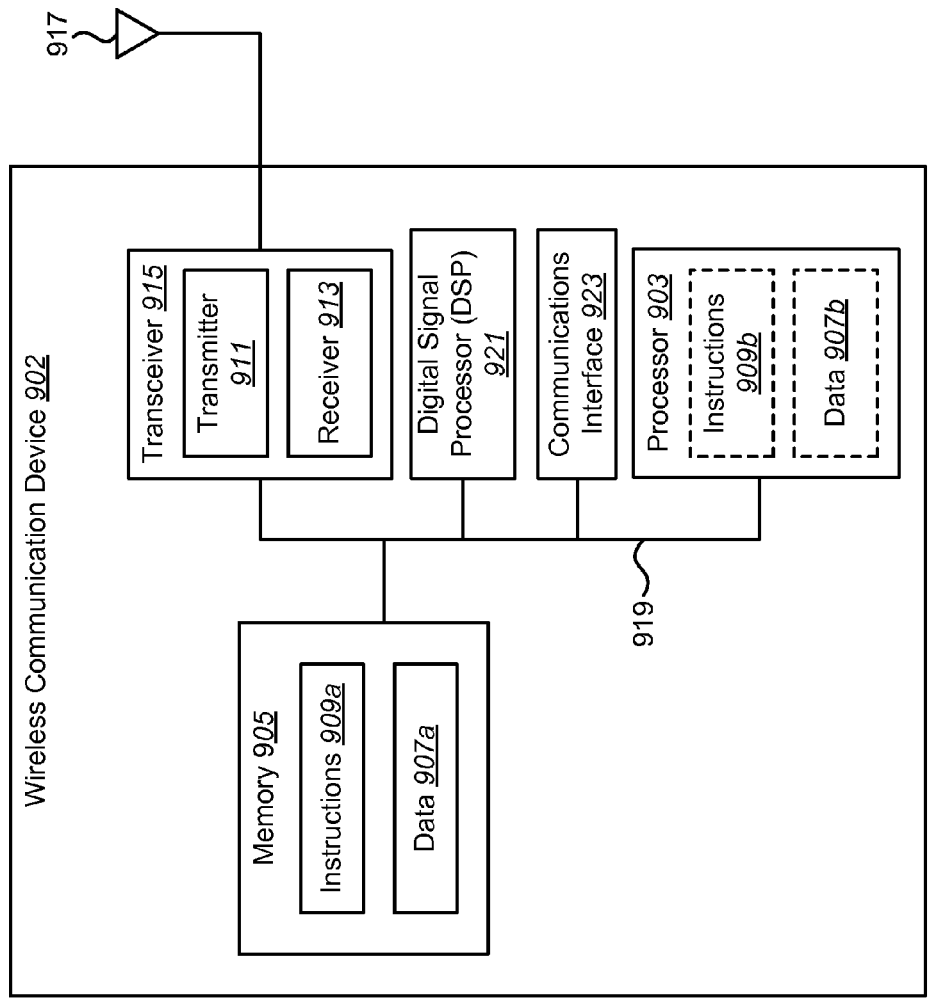
FIG. 9 illustrates certain components that may be included within a wireless communication device.

FIG. 9 illustrates certain components that may be included within a wireless communication device 902. The wireless communication device 902 may be an access terminal, a mobile station, a user equipment (UE), etc. The wireless communication device 902 includes a processor 903. The processor 903 may be a general purpose single- or multi-chip microprocessor (e.g., an ARM), a special purpose microprocessor (e.g., a digital signal processor (DSP)), a microcontroller, a programmable gate array, etc. The processor 903 may be referred to as a central processing unit (CPU). Although just a single processor 903 is shown in the wireless communication device 902 of FIG. 9, in an alternative configuration, a combination of processors (e.g., an ARM and DSP) could be used.

The wireless communication device 902 also includes memory 905. The memory 905 may be any electronic component capable of storing electronic information. The memory 905 may be embodied as random access memory (RAM), read-only memory (ROM), magnetic disk storage media, optical storage media, flash memory devices in RAM, on-board memory included with the processor, EPROM memory, EEPROM memory, registers and so forth, including combinations thereof.

Data 907a and instructions 909a may be stored in the memory 905. The instructions 909a may be executable by the processor 903 to implement the methods disclosed herein. Executing the instructions 909a may involve the use of the data 907a that is stored in the memory 905. When the processor 903 executes the instructions 909, various portions of the instructions 909b may be loaded onto the processor 903, and various pieces of data 907b may be loaded onto the processor 903.

The wireless communication device 902 may also include a transmitter 911 and a receiver 913 to allow transmission and reception of signals to and from the wireless communication device 902 via an antenna 917. The transmitter 911 and receiver 913 may be collectively referred to as a transceiver 915. The wireless communication device 902 may also include (not shown) multiple transmitters, multiple antennas, multiple receivers and/or multiple transceivers.

The wireless communication device 902 may include a digital signal processor (DSP) 921. The wireless communication device 902 may also include a communications interface 923. The communications interface 923 may allow a user to interact with the wireless communication device 902.

The various components of the wireless communication device 902 may be coupled together by one or more buses, which may include a power bus, a control signal bus, a status signal bus, a data bus, etc. For the sake of clarity, the various buses are illustrated in FIG. 9 as a bus system 919.

Figure 10:
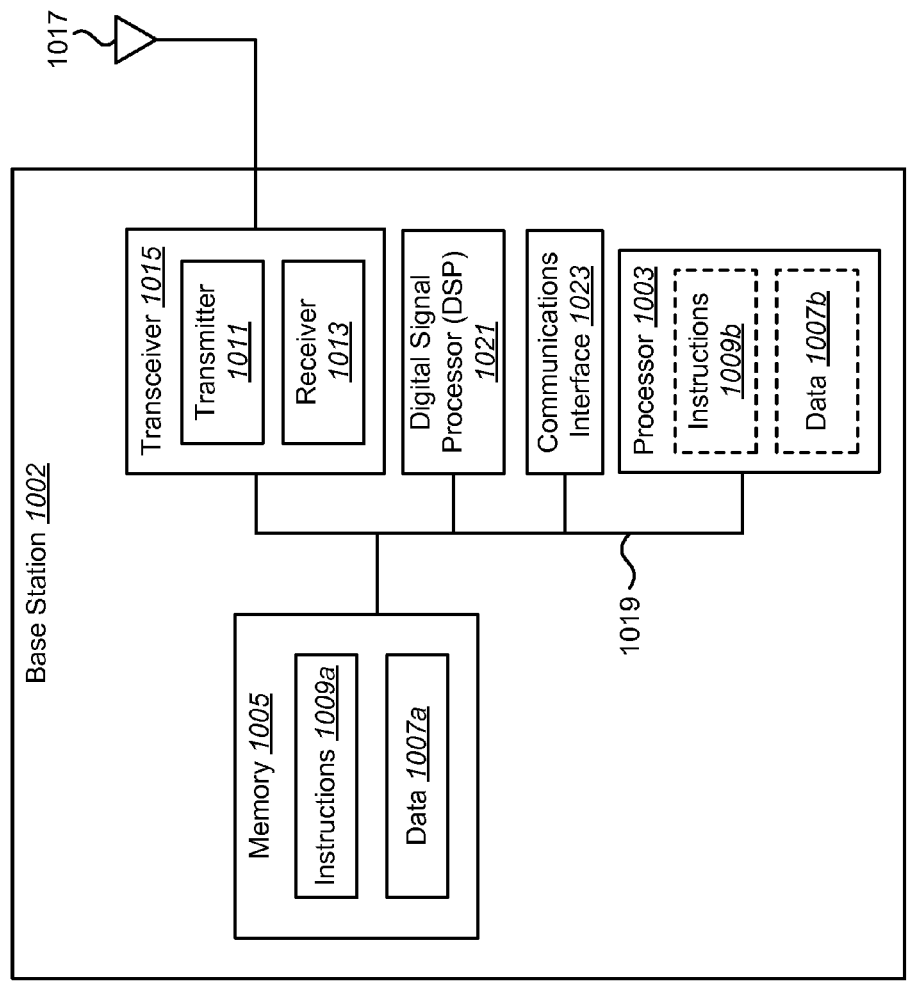
FIG. 10 illustrates certain components that may be included within a base station.

FIG. 10 illustrates certain components that may be included within a base station 1002. A base station may also be referred to as, and may include some or all of the functionality of, an access point, a broadcast transmitter, a NodeB, an evolved NodeB, etc. The base station 1002 includes a processor 1003. The processor 1003 may be a general purpose single- or multi-chip microprocessor (e.g., an ARM), a special purpose microprocessor (e.g., a digital signal processor (DSP)), a microcontroller, a programmable gate array, etc. The processor 1003 may be referred to as a central processing unit (CPU). Although just a single processor 1003 is shown in the base station 1002 of FIG. 10, in an alternative configuration, a combination of processors (e.g., an ARM and DSP) could be used.

The base station 1002 also includes memory 1005. The memory 1005 may be any electronic component capable of storing electronic information. The memory 1005 may be embodied as random access memory (RAM), read only memory (ROM), magnetic disk storage media, optical storage media, flash memory devices in RAM, on-board memory included with the processor, EPROM memory, EEPROM memory, registers, and so forth, including combinations thereof.

Data 1007a and instructions 1009a may be stored in the memory 1005. The instructions 1009a may be executable by the processor 1003 to implement the methods disclosed herein. Executing the instructions 1009a may involve the use of the data 1007a that is stored in the memory 1005. When the processor 1003 executes the instructions 1009a, various portions of the instructions 1009b may be loaded onto the processor 1003, and various pieces of data 1007b may be loaded onto the processor 1003.

The base station 1002 may also include a transmitter 1011 and a receiver 1013 to allow transmission and reception of signals to and from the base station 1002. The transmitter 1011 and receiver 1013 may be collectively referred to as a transceiver 1015. An antenna 1017 may be electrically coupled to the transceiver 1015. The base station 1002 may also include (not shown) multiple transmitters, multiple receivers, multiple transceivers and/or multiple antennas.

The base station 1002 may include a digital signal processor (DSP) 1021. The base station 1002 may also include a communications interface 1023. The communications interface 1023 may allow a user to interact with the base station 1002.

The various components of the base station 1002 may be coupled together by one or more buses, which may include a power bus, a control signal bus, a status signal bus, a data bus, etc. For the sake of clarity, the various buses are illustrated in FIG. 10 as a bus system 1019.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

The term "processor" should be interpreted broadly to encompass a general purpose processor, a central processing unit (CPU), a microprocessor, a digital signal processor (DSP), a controller, a microcontroller, a state machine and so forth. Under some circumstances, a "processor" may refer to an application specific integrated circuit (ASIC), a programmable logic device (PLD), a field programmable gate array (FPGA), etc. The term "processor" may refer to a combination of processing devices, e.g., a combination of a DSP and a microprocessor, a plurality of microprocessors, one or more microprocessors in conjunction with a DSP core, or any other such configuration.

The term "memory" should be interpreted broadly to encompass any electronic component capable of storing electronic information. The term memory may refer to various types of processor-readable media such as random access memory (RAM), read-only memory (ROM), non-volatile random access memory (NVRAM), programmable read-only memory (PROM), erasable programmable read-only memory (EPROM), electrically erasable PROM (EEPROM), flash memory, magnetic or optical data storage, registers, etc. Memory is said to be in electronic communication with a processor if the processor can read information from and/or write information to the memory. Memory that is integral to a processor is in electronic communication with the processor.

The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may comprise a single computer-readable statement or many computer-readable statements.

The functions described herein may be implemented in software or firmware being executed by hardware. The functions may be stored as one or more instructions on a computer-readable medium. The terms "computer-readable medium" or "computer-program product" refers to any tangible storage medium that can be accessed by a computer or a processor. By way of example, and not limitation, a computer-readable medium may include RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray® disc where disks usually reproduce data magnetically, while discs reproduce data optically with lasers. It should be noted that a computer-readable medium may be tangible and non-transitory. The term "computer-program product" refers to a computing device or processor in combination with code or instructions (e.g., a "program") that may be executed, processed or computed by the computing device or processor. As used herein, the term "code" may refer to software, instructions, code or data that is/are executable by a computing device or processor.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio and microwave, then the coaxial cable, fiber optic cable, twisted pair, DSL, or wireless technologies such as infrared, radio and microwave are included in the definition of transmission medium.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

Further, it should be appreciated that modules and/or other appropriate means for performing the methods and techniques described herein, such as those illustrated by FIG. 4 and FIG. 8, can be downloaded and/or otherwise obtained by a device. For example, a device may be coupled to a server to facilitate the transfer of means for performing the methods described herein. Alternatively, various methods described herein can be provided via a storage means (e.g., random access memory (RAM), read-only memory (ROM), a physical storage medium such as a compact disc (CD) or floppy disk, etc.), such that a device may obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the systems, methods and apparatus described herein without departing from the scope of the claims.

What is claimed is:

1. A wireless device for receiving wireless signals based on channel conditions, comprising:
   a direct sampling path used for operations in a direct sampling mode, wherein the direct sampling path comprises a tunable low pass filter module;
   a zero intermediate frequency path for operations in a normal sampling mode, wherein the zero intermediate frequency path comprises a mixer, an oscillator and an amplifier;
   a first switch coupling a filter module input to an input of the direct sampling path and an input of the zero intermediate frequency path; and
   a second switch coupling a filter module output to an output of the direct sampling path and an output of the zero intermediate frequency path, wherein the first switch and the second switch are configured to switch between the direct sampling path and the zero intermediate frequency path based on a received signal power,
wherein the wireless device is configured to operate in the direct sampling mode when the received signal power is greater than a received signal power threshold, and wherein the received signal power threshold varies according to at least one of a power capacity and a battery life of the wireless device.

2. The wireless device of claim 1, wherein the first switch and the second switch are positioned to allow a signal to pass through the direct sampling path when operating in the direct sampling mode.

3. The wireless device of claim 1, wherein the first switch and the second switch are positioned to allow a signal to pass through the zero intermediate frequency path when operating in a normal sampling mode.

4. The wireless device of claim 1, further comprising an analog-to-digital converter coupled to the second switch.

5. The wireless device of claim 4, wherein the analog-to-digital converter is configured to sample a signal at a direct sampling rate when operating in the direct sampling mode.

6. The wireless device of claim 4, wherein the analog-to-digital converter is configured to sample a signal at a normal sampling rate when operating in the normal sampling mode.

7. The wireless device of claim 1, further comprising a transceiver, wherein the direct sampling path and the zero intermediate frequency path are implemented on the transceiver.

8. The wireless device of claim 1, further comprising a first transceiver and a second transceiver, wherein the direct sampling path is implemented on the first transceiver and the zero intermediate frequency path is implemented on the second transceiver.

9. The wireless device of claim 8, wherein the first transceiver and the second transceiver are coupled to an analog-to-digital converter, wherein the analog-to-digital converter is configured to sample a signal at a direct sampling rate when operating in the direct sampling mode and at a normal sampling rate when operating in the normal sampling mode.

10. The wireless device of claim 8, wherein the first transceiver comprises a first analog-to-digital converter configured to sample a signal at a direct sampling rate, and wherein the second transceiver comprises a second analog-to-digital converter configured to sample a signal at a normal sampling rate.

11. The wireless device of claim 1, wherein the direct sampling mode comprises operating in one of an undersampling mode, a Nyquist mode and an oversampling mode.

12. The wireless device of claim 1, wherein operating in the normal sampling mode uses more battery power than the operating in the direct sampling mode.

13. A wireless device for receiving wireless signals based on channel conditions, comprising:
a direct sampling path used for operations in a direct sampling mode, wherein the direct sampling path comprises a tunable low pass filter module;
a zero intermediate frequency path for operations in a normal sampling mode, wherein the zero intermediate frequency path comprises a mixer, an oscillator and an amplifier;
a first switch coupling a filter module input to an input of the direct sampling path and an input of the zero intermediate frequency path; and
a second switch coupling a filter module output to an output of the direct sampling path and an output of the zero intermediate frequency path, wherein the first switch and the second switch are configured to switch between the direct sampling path and the zero intermediate frequency path based on a received signal power,
wherein the wireless device is configured to operate in the normal sampling mode when the received signal power is less than or equal to a received signal power threshold, and wherein the received signal power threshold varies according to at least one of a power capacity and a battery life of the wireless device.

14. A wireless device for receiving wireless signals based on channel conditions, comprising:
a direct sampling path used for operations in a direct sampling mode, wherein the direct sampling path comprises a tunable low pass filter module;
a zero intermediate frequency path for operations in a normal sampling mode, wherein the zero intermediate frequency path comprises a mixer, an oscillator and an amplifier;
a first switch coupling a filter module input to an input of the direct sampling path and an input of the zero intermediate frequency path; and
a second switch coupling a filter module output to an output of the direct sampling path and an output of the zero intermediate frequency path, wherein the first switch and the second switch are configured to switch between the direct sampling path and the zero intermediate frequency path based on a received signal power,
wherein the wireless device is configured to operate in the direct sampling mode when a carrier-to-noise ratio is greater than a carrier-to-noise ratio threshold, and wherein the carrier-to-noise ratio threshold varies according to at least one of a power capacity and a battery life of the wireless device.

15. The wireless device of claim 14, wherein operating in the normal sampling mode uses more battery power than the operating in the direct sampling mode.

16. A wireless device for receiving wireless signals based on channel conditions, comprising:
a direct sampling path used for operations in a direct sampling mode, wherein the direct sampling path comprises a tunable low pass filter module;
a zero intermediate frequency path for operations in a normal sampling mode, wherein the zero intermediate frequency path comprises a mixer, an oscillator and an amplifier;
a first switch coupling a filter module input to an input of the direct sampling path and an input of the zero intermediate frequency path; and
a second switch coupling a filter module output to an output of the direct sampling path and an output of the zero intermediate frequency path, wherein the first switch and the second switch are configured to switch between the direct sampling path and the zero intermediate frequency path based on a received signal power,
wherein the wireless device is configured to operate in the normal sampling mode when a carrier-to-noise ratio is less than or equal to a carrier-to-noise ratio threshold, and wherein the carrier-to-noise ratio threshold varies according to at least one of a power capacity and a battery life of the wireless device.

17. A method for receiving a received signal based on channel conditions, comprising:
receiving a received signal using an antenna;
determining whether a received signal power is greater than a received signal power threshold; and
switching between a direct sampling mode and a normal sampling mode based on the determination, wherein the direct sampling mode includes operating a tunable low pass filter module, and wherein the normal sampling mode includes operating a mixer, an oscillator and an amplifier, wherein the received signal power is determined to be greater than the received signal power threshold, wherein the received signal power threshold varies according to at least one of a power capacity and a battery life of a wireless device, and wherein the method further comprises switching to the direct sampling mode.

18. The method of claim 17, wherein switching to the direct sampling mode comprises:

adjusting a first switch to couple an input of the tunable low pass filter module to an input of a direct sampling path; and adjusting a second switch to couple an output of the tunable low pass filter module to an analog-to-digital converter.

19. The method of claim 18, further comprising:

filtering a signal using the tunable low pass filter module on the direct sampling path; and providing a filtered signal to the analog-to-digital converter.

20. The method of claim 19, further comprising sampling the filtered signal at a direct sampling rate using the analog-to-digital converter.

21. The method of claim 17, further comprising:

determining whether a carrier-to-noise ratio of the received signal is greater than a carrier-to-noise ratio threshold; and switching between the direct sampling mode and the normal sampling mode based on whether the carrier-to-noise ratio of the received signal is greater than the carrier-to-noise ratio threshold.

22. The method of claim 17, wherein the direct sampling mode comprises operating in one of an undersampling mode, a Nyquist mode and an oversampling mode.

23. A method for receiving a received signal based on channel conditions, comprising:

receiving a received signal using an antenna;

determining whether a received signal power is greater than a received signal power threshold; and switching between a direct sampling mode and a normal sampling mode based on the determination, wherein the direct sampling mode includes operating a tunable low pass filter module, and wherein the normal sampling mode includes operating a mixer, an oscillator and an amplifier, wherein the received signal power is determined to be less than or equal to the received signal power threshold, wherein the received signal power threshold varies according to at least one of a power capacity and a battery life of a wireless device, and wherein the method further comprises switching to the normal sampling mode.

24. The method of claim 23, wherein switching to the normal sampling mode comprises:

adjusting a first switch to couple an input of the mixer to a zero intermediate frequency path; and adjusting a second switch to couple an output of the amplifier to an analog-to-digital converter.

25. The method of claim 24, further comprising:

filtering a signal using the zero intermediate frequency path; and providing a filtered signal to the analog-to-digital converter.

26. The method of claim 25, further comprising sampling the filtered signal at a normal sampling rate using the analog-to-digital converter.

27. An apparatus for receiving wireless signals based on channel conditions, comprising:

means for receiving a received signal;

means for determining whether a received signal power is greater than a received signal power threshold; and means for switching between a direct sampling mode and a normal sampling mode based on the determination, wherein the direct sampling mode includes operating a tunable low pass filter module, and wherein the normal sampling mode includes operating a mixer, an oscillator and an amplifier, wherein the received signal power is determined to be greater than the received signal power threshold, wherein the received signal power threshold varies according to at least one of a power capacity and a battery life of a wireless device, and further comprising means for switching to the direct sampling mode.

28. The apparatus of claim 27, further comprising:

means for filtering a signal using a direct sampling path, wherein the means for filtering includes the tunable low pass filter module; and means for sampling the filtered signal at a direct sampling rate.

29. An apparatus for receiving wireless signals based on channel conditions, comprising:

means for receiving a received signal;

means for determining whether a received signal power is greater than a received signal power threshold; and means for switching between a direct sampling mode and a normal sampling mode based on the determination, wherein the direct sampling mode includes operating a tunable low pass filter module, and wherein the normal sampling mode includes operating a mixer, an oscillator and an amplifier, wherein the received signal power is determined to be less than or equal to the received signal power threshold, wherein the received signal power threshold varies according to at least one of a power capacity and a battery life of a wireless device, and further comprising means for switching to the normal sampling mode.

30. The apparatus of claim 29, further comprising:

means for filtering a signal using a zero intermediate frequency path, wherein the means for filtering includes the mixer, the oscillator and the amplifier; and means for sampling the filtered signal at a normal sampling rate using an analog-to-digital converter.

\* \* \* \* \*